United States Patent [19]

Ichikawa et al.

[11] 3,926,651

[45] Dec. 16, 1975

[54] METHOD AND APPARATUS FOR USE IN FIRING RAW MATERIAL FOR CEMENT

[75] Inventors: Yoshihiro Ichikawa; Tetsuo Fujisawa, both of Nishinomiya; Yoshiro Seo, Kobe, all of Japan

[73] Assignee: Kobe Steel, Ltd., Kobe, Japan

[22] Filed: Dec. 5, 1973

[21] Appl. No.: 421,804

[30] Foreign Application Priority Data

Dec. 8, 1972   Japan............................. 47-123069

[52] U.S. Cl. ................................................ 106/100
[51] Int. Cl.$^2$............................................ C04B 7/44
[58] Field of Search ................................... 106/100

[56] References Cited
UNITED STATES PATENTS

| | | | |
|---|---|---|---|
| 1,605,279 | 11/1926 | Pike ..................................... | 106/100 |
| 1,912,811 | 6/1933 | Wechter ............................... | 106/100 |
| 3,091,443 | 5/1963 | Herz ..................................... | 106/100 |
| 3,139,463 | 6/1964 | Wuhrer................................. | 106/100 |
| 3,235,239 | 2/1966 | Petersen .............................. | 106/100 |
| 3,498,594 | 3/1970 | Rikhof.................................. | 106/100 |

*Primary Examiner*—J. Poer
*Attorney, Agent, or Firm*—Oblon, Fisher, Spivak, McClelland & Maier

[57] ABSTRACT

A method and an apparatus are disclosed for use in firing the raw materials for producing cement wherein a combination of a rotary kiln and a preheating device of a counter-flow type heat exchange system are utilized. The difficulties and drawbacks previously encountered with such type heat exchange systems, such as instabilities in flow and heat control, are avoided by the use of proper temperature adjustment, the application of additional heat, powdery-material preheating apparatus including a divergent nozzle and controls of the flow speed of a hot gas passing through the aforesaid system, thereby achieving considerable thermal economy and improved yield of cement per plant, without resorting to increase in the size of the rotary kiln.

4 Claims, 1 Drawing Figure

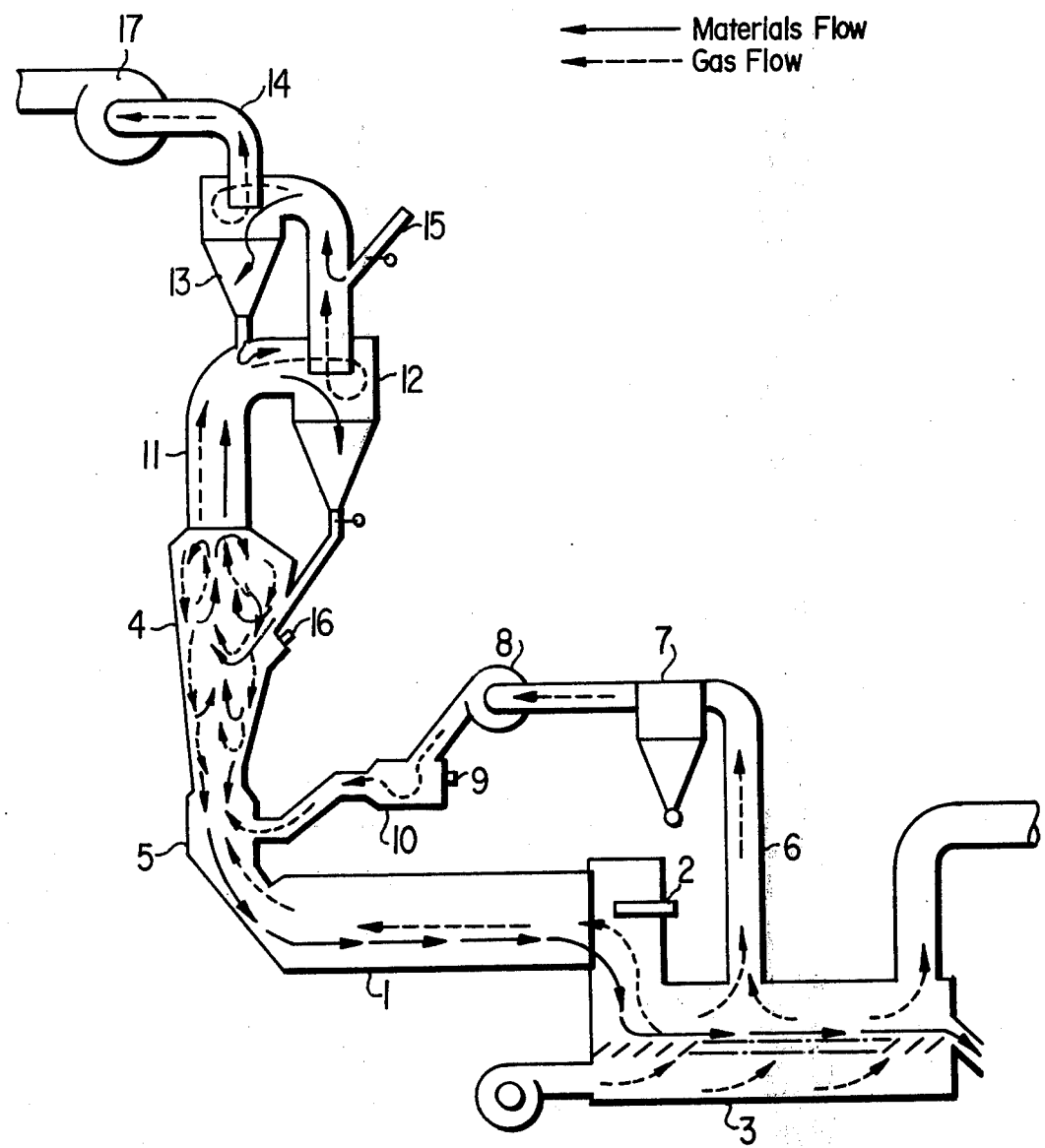

METHOD AND APPARATUS FOR USE IN FIRING RAW MATERIAL FOR CEMENT

BACKGROUND OF THE INVENTION

1. Field of the Invention

This invention relates generally to a method and an apparatus for use in firing the raw materials for producing cement, and more particularly to those using a combination of a rotary kiln and a preheating device according to a counter-flow heat exchange system.

2. Description of the Prior Art

Many approaches have been suggested for improving the firing efficiency in a rotary kiln, as well as the thermal economy of the entire apparatus being used in firing the raw materials for producing cement, by using a preheating device, into which hot gas being exhausted from the rotary kiln is introduced and in which the heat contained thereby is utilized for preheating the raw materials.

These previous approaches of methods for utilizing the hot gas being exhausted from the kiln for preheating the raw materials for producing cement may be classified into two types, namely, the so called counter-flow type heat exchange system and the parallel flow type heat exchange system.

The former counter-flow heat exchange system uses the flow of powdery raw material for cement against those of the hot gas being exhausted from the kiln, while the latter parallel flow heat exchange system uses a gas flow which carries powdery raw material for cement thereon and thereby the heat exchange is carried out in the flowing course of the hot gas.

It may be apparent when considering the thermal principle thereof that the counter-flow type is much superior to the parallel flow type in every respect, for example, because the powdery material may often be encountered by new hot gas due to counter flowing or turbulent flow arising therefrom and because of the resultant satisfactory mixing condition of the two flows. However, because the powdery raw material for cement consists of minute particles having an average particle size of $50\mu$, the control of the flow of such minute particles and the flow of the hot gas, as well as the temperature control of such portions of the apparatus which affect the achievement of efficient production of cement, are extremely complicated, such that the application of the counter-flow heat exchange system presents many difficulties. For this reason, the parallel flow heat exchange system has heretofore found the widest application.

Meanwhile, one example of the counter-flow type heat exchange system is disclosed in U.S. Pat. No. 3,265,775, in which the achievement of excellent heat exchange may be expected due to its provision of using counter flows of powdery raw material for cement and a hot gas in a manner that the counter flow takes place in a divergent type, nozzle-like, vertical cylinder. However, the mere use of such a counter-flow heat exchange system is not always the solution to this problem, because the heat exchange between the powdery raw material and a preheated hot gas is a partial problem within the total system, namely, it is left unsolved to determine how to supply the hot gas, how to control the temperature in a preheating device and furthermore how to achieve an efficient heat exchanging effect in the total system.

On the other hand, there is another aspect of difficulties attendant to the firing method of raw material for cement. Recently, there has arisen a strong demand from industries for improving the productivity of cement per plant. However, irrespective of whether it is of a counter-flow type heat exchange or of a parallel flow heat exchange, there are limiting factors. More particularly, for increasing the firing or burning amount of raw material for cement, the size of the rotary kiln should be enlarged or additional heat should be added thereto. Nevertheless, such increase in size of the rotary kiln dictates modifications of the dimensions of the other attendant equipment, and thus the entire apparatus must be enlarged. On the other hand, increasing the heat to be added leads to an increase in the temperature in the rotary kiln. This, however, is not recommendable, because the rotary kiln is known to suffer from poor thermal efficiency, and thus such temperature rise therein results in a considerable amount of heat loss. Furthermore, the temperature of the exhaust gas from the kiln will be extremely increased, such that the preheating device is exposed to the high temperature and, as a result, the raw material will be partially overheated, thereby becoming sticky and hence adhering to the inner wall of the preheating device, and thus exerting an adverse effect on the sound operation of the rotary kiln.

In view of such shortcomings and difficulties, the parallel flow heat exchange system for preheating the raw materials for producing cement as the final step of the firing schedule is particularly constructed as a heating furnace, or the powdery raw material from the final step of the process is introduced onto a floating bed, whereby fuel is additionally supplied to a furnace or other device to thereby effect calcination of the raw material. By minimizing the thermal work done in the rotary kiln which, as heretofore mentioned, possesses inherent poor heat exchange efficiency, an attempt is made to increase the yield of cement per hour of the plant.

An example of this type is disclosed in U.S. Pat. Nos. 3,235,239 and 1,605,279, wherein fuel is added to hot air obtained by cooling burnt or fired cement raw material, that is, clinker, and the gas thus heated is then brought into contact with powdery raw material for cement in a parallel flow heat exchange system, such as a suspension preheater. In addition, it is known that, in the parallel flow heat exchange system, powdery material is introduced in the preheating device in the flowing direction of the gas and is burnt therein, thereby efficiently supplying heat to the powdery material.

In contrast thereto, the counter-flow heat exchange system used for preheating, which is desirable from the thermal viewpoint, suffers from difficulties in controlling temperatures at various portions of the apparatus due to the complicated influence of the flowing gas and powdery raw material, and such difficulties have thus far remained unsolved.

SUMMARY OF THE INVENTION

Accordingly, it is an object of the present invention to provide a method using a counter-flow type heat exchange device in which the intended firing of the powdery raw material is carried out satisfactorily, with the powdery raw material being fed against the flowing direction of a hot gas.

It is a further object of the present invention to provide a method and apparatus using a counter-flow heat exchange device which affords an efficient heat supply and avoids the recognized difficulties experienced with conventional counter-flow heat exchange devices in firing raw materials for producing cement.

It is yet a further object of the present invention to provide a method and apparatus for firing raw materials in producing cement, using a counter-flow heat exchange of the character described which permits satisfactory temperature control of a preheating device and the intimate contact of powdery raw material with hot gas, or more particularly, which provides excellent heat exchange efficiency.

The foregoing and other objects are achieved according to the present invention, in a counter-flow heat exchange device for use in firing powdery raw material for producing cement in a rotary kiln, by passing a hot gas of a cooling device, in which the hot, burnt cement raw material is cooled by cool air, and heating the gas to a certain temperature and mixing it with a hot gas directly exhausted from the kiln, in a manner that the temperature of the gases thus mixed is higher than that of the cement raw material being fed to the kiln. Then, the mixed gases are introduced into an upwardly divergent nozzle type vertical cylinder from the bottom, the cylinder being adapted to preheat raw material before it is introduced into the kiln. At the same time, a fresh raw material is fed into the cylinder from above so as to flow downwardly against the upwardly flowing, or ascending, hot, mixed gases, while fuel is supplied into the cylinder to further heat the same. The powdery raw material for cement which drops against the ascending flow of the hot mixed gases in the cylinder is then introduced into the kiln to be subjected to firing by suitable burners.

The steps of the method of the invention may be summarized as follows:

i. The hot air rising in the cooling device, in which the burnt or fired cement raw material is cooled with cool air, is heated to a predetermined temperature by adding heat corresponding to below 10% of the total heat to be supplied in the entire process;

ii. The hot air as heated in this manner is then mixed with hot gas being directly exhausted from the rotary kiln;

iii. The hot mixed gas obtained in the previous step is introduced into an upwardly divergent nozzle-type vertical cylinder from the bottom thereof, the cylinder being adapted to preheat the raw material before feeding the same into the kiln;

iv. Cement raw material of a powder form is supplied into the vertical cylinder from above;

v. Fuel producing heat corresponding to 30 to 70% of the total heat to be supplied to the entire process of the invention is fed into the vertical cylinder; and vi. The cement raw material which has been dropped from above against the ascending flow of the mixed gas is introduced into the kiln and heated by using the remaining heat of the total heat to be supplied to the entire process of the invention.

In this manner, an efficient firing of the raw material for producing cement in the rotary kiln is provided and satisfactory burning of the raw material in a preheating or vertical cylinder under optimum temperature control of gas mixed at the bottom thereof, as well as the intimate mixture of the powdery raw material with the mixed gas, coupled with efficient heat exchange as well as transmission of the heat produced due to burning of the powdery raw material, are achieved.

It should be recognized that heating of hot air from a cooling device and supplying the hot air to the vertical cylinder after mixing the same with hot gas from the kiln aids successfully in controlling the temperature and flow of the powdery raw material inside the preheating or vertical cylinder, thereby presenting an optimum condition for burning within the vertical cylinder at all times, and thus solving the problems of thermal and fluid instability of conventional counter-flow heat exchange devices. It is another important aspect of the invention that cement raw material of a powder form is supplied into the preheating or vertical cylinder in a manner to flow downwardly therein against the ascending flow of hot gas to thereby cause vigorous turbulent flows therein, with the result that the powdery raw material may contact with hot gas in a satisfactory manner and may directly absorb the heat produced due to burning. The raw material thus burnt may drop downwardly therethrough, due to the quantitative condition of the raw material, against the ascending flow of hot gas and thus is introduced into the final step, that is, into the rotary kiln for firing treatment.

In addition to the aforesaid aspects of the invention, although the powdery raw material for cement is fed into the preheating or vertical cylinder from above, the powdery raw material may be collected in collecting devices, such as cyclones, and returned to the vertical cylinder through a duct opening in the vicinity of the inlet for fresh raw material of cement, and by repeating such a cycle, there may be achieved satisfactory mixing of the raw material with hot gas. In this respect, the raw material may be separated from gas flow under the action of a centrifugal force of whirl flows caused therein, thereby increasing the density thereof, and then the raw material can flow downwardly for being fed into the rotary kiln.

BRIEF DESCRIPTION OF THE DRAWING

Various other objects, features and attendant advantages of the present invention will be more fully appreciated as the same becomes better understood from the following detailed description when considered in connection with the accompanying drawing, wherein the Sole FIGURE is a schematic view illustrating the flow of powdery raw material for cement and the burning condition of fuel with hot air according to a preferred embodiment of the invention.

DETAILED DESCRIPTION OF THE PREFERRED EMBODIMENTS

Briefly, according to the present invention, an inverted conical or pyramid-shaped vertical cylinder is used as a main preheating device, and powdery raw material for cement is heated in a rotary kiln to a constant temperature which is required for enhancing the reaction for producing clinker therein, whereby the gas exhausted from the rotary kiln may be maintained at a constant temperature. On the other hand, part of hot air rising in a cooling device, in which the burnt or fired raw material is cooled with a cool air, is mixed with the hot exhaust gas from the rotary kiln after the hot air has first been heated with additional fuel, and then the gases thus mixed are introduced into the preheating vertical cylinder from the bottom thereof. In this respect, the temperature of the hot gaseous mixture is maintained at a temperature of between 900° and 1100°C, somewhat higher than that of the raw material being fed from the preheating device to the rotary kiln, by using hot air passing the cooling device, while the temperature of the hot air is adjusted in the aforesaid manner. The hot gaseous mixture so maintained to such a specific temperature then flows upwardly, or ascends, through the preheating vertical cylinder to thereby produce a plurality of whirl or turbulent flows therein, while the cement raw material in the form of powder is supplied into the preheating vertical cylinder from above to thereby form counter flows with the ascending hot gas. In this manner, the powdery raw material is injected toward the center of the cylinder for burning due to the mixture of the hot gas and hot air supplied from below, thereby maintaining the center portion of the cylinder at a high temperature which effects the calcination of the raw material, while the powdery raw material coming out of the vertical cylinder is collected in collectors, such as cyclones, and caused to return to the vertical cylinder. In this manner, such a cycle is repreheated. During such a circulation of material, the density thereof is increased, and the raw material is subjected to the action of a centrifugal force caused by whirl flows or turbulent flows of the mixed gas, such that the powdery raw material is separated from the gas flow and flows downwardly along the inner wall of a kiln against the ascending flow of the mixed hot gas introduced in the cylinder from below and is finally fed into the rotary kiln. Thus, the calcination of the powdery raw material may be efficiently carried out, and the inner peripheral wall of the vertical cylinder may be maintained at an optimum calcination temperature of 800° to 900°C, thereby preventing melt-adhesion of the powdery raw material to the inner wall of the cylinder.

Referring now to the sole FIGURE of the drawing, a known type rotary kiln 1 is shown having at one end thereof a burner 2 adapted to supply heat required for firing or burning the raw material for cement in the kiln. Clinker produced in the rotary kiln 1 is then transferred to a cooling device 3 which is provided adjacent to the kiln, and then the clinker is delivered to a crushing means, not shown, to give it a powdery form. On the other hand, a main preheating device having an inverted conical shape of a vertical cylinder 4 is connected through a duct 5 at its lower end with the other end of the rotary kiln 1. Connected with the duct 5 is a duct 6 adapted to introduce hot air from the cooling device 3 therethrough, while a dust collector 7 is provided in the duct 6 midway thereof to collect therein dust contained in the heated hot gas. In addition to this, a blower 8 adapted to feed hot air through the duct 6 to the duct 5 and a temperature adjusting means 10, including a burner 9 adapted to maintain the hot air at a given temperature, are provided in the duct 6 downstream of the dust collector 7.

Connected with the upper end of the vertical chamber 4 through a vertical duct 11 is a first cyclone 12 disposed to one side of duct 11, in turn being connected at its top end through a substantially vertical duct 14 with a cyclone 13 disposed above duct 11, while cement raw material is fed through a chute 15 into one side of the duct 14. Both cyclones 12 and 13 have increasing cross-sectional areas from bottom toward top in the lower portions thereof, that is, they are preferably funnel-shaped in their lower half portions. The raw material collected in the cyclone 12 is then supplied through the bottom opening thereof into the vertical cylinder 4 through an opening provided in the side wall of the cylinder, while the raw material collected in the cyclone 13 is supplied through the bottom opening thereof into the top of the duct 11. Valves may be disposed in the bottom openings of cyclones 12 and 13 and in the chute 15 for controlling the degree of openings thereof.

As has been described earlier, the hot mixed gas is introduced into the preheating vertical cylinder 4 of an inverted conical or pyramid shape through the lower small diameter portion of the cylinder, and the flow of hot mixed gas is subjected to expansion due to the enlarged side wall or shell portion of increasing cross-sectional area of the cylinder during its upward flow therein, thereby presenting a plurality of whirl flows, as shown by arrows in the drawing, along the longitudinal direction of the cylinder around central ascending flows therein. Then, the powdery raw material is injected into the whirl flows thus formed through chute 15 and cyclone 12, being then carried thereon to cause circulation therein, during which time the raw material may be heated by the heat contained in the exhaust gas. On the other hand, part of the powdery raw material is released from the whirl flows and joins the central ascending flow, followed by ascending through the duct 11 and then to the cyclone 12 through ductwork connecting the tops thereof. In this cyclone 12, the powdery raw material is separated from the gas flow because of centrifugal separation therein, and returns to the vertical cylinder 4 through the bottom of cyclone 12. Thus, as the powdery raw material is continuously supplied through the chute 15 into the cylinder 4, the density of powdery raw material is increased, such that part of the powdery raw material is separated from the whirl flows, partly due to the centrifugal action of the whirl flows, and then the material flows downwardly along the inner peripheral wall of the cylinder through the lower small diameter portion of the cylinder 4 for being fed into the rotary kiln. It should be noted however that according to the present invention, the powdery raw material is injected inwardly through the opening provided in the side wall of the cylinder, with the aid of the burner 16 blowing toward the center portion of the cylinder, thereby calcinating powdery raw material in a flowing condition. In addition to this, for maintaining the hot gas present in the center of the cylinder at a high temperature which effects efficient calcination of the raw material and for providing the air necessary for such calcination in the cylinder, the hot gas containing air of an amount required for the aforesaid calcination is introduced into the cylinder from therebeneath. To this end, the hot air from the cooling device 3, in which burnt clinker is cooled, rising through duct 6, is heated by burner 9 and then mixed with hot gas being directly exhausted from the rotary kiln 1. At this time, the hot air from the cooling device 3 is heated by the burner 9 incorporated in the temperature adjusting means 10 in a manner that the temperature of the mixture of the hot air from the cooling device and the hot gas from the kiln 1 may be maintained at a temperature of between 900° and 1100°C, or somewhat higher than that of the raw material which has been calcinated in the preheating cylinder and is being fed into the rotary kiln. Accordingly, the initial temperature of the gas-air mixture to be introduced into the vertical cylinder is maintained constant, which in turn maintains the internal temperature of the cylinder constant by controlling the flow rate of the gas-air mixture being thus supplied.

The heat to be supplied through the temperature adjusting means 10 should correspond to below 10% of the total heat to be supplied to the entire process of the invention, and the heat to be supplied into the vertical cylinder 4 should correspond to between 30 and 70% of the aforesaid total heat. Preferably, however, the heat to be supplied to the hot air rising from the cooling device is from 3 to 8% and that to the vertical cylinder is from 50 to 65%, respectively, of the total heat to be supplied to the entire process of the invention. The flow speed of the gas through the vertical cylinder 4 may be increased in proportion to the increase in the amount of air being delivered from a blower 17 disposed above the cyclone 13 and receiving air therefrom as it whirls after being received through duct 14. However, as shown in the table below, if the flow speed is excessively increased, the separation or sinking of the powdery raw material will not take place in the vertical cylinder, unless the density or concentration of the material is significantly increased, in terms of a given temperature.

| Equilibrium Concentration of Powdery Raw Material Within a Conical, Vertical Cylinder (kg/kg) | |
|---|---|
| Flow Speed of Gas at a Smallest Cross-Sectional Area | Weight of Powdery Raw Material per unit Weight of Gas |
| 20 m/s | 3.1 |
| 25 m/s | 3.5 |
| 30 m/s | 5.0 |

In this case, however, the gas temperature was maintained at 1000°C, while the conical angle of the wall of the cylinder was designed to be 18°.

The increase in the density of the raw material dictates an increase in the amount of fuel and hot air, if efficient calcination of the powdery raw material is to be achieved. Accordingly, in terms of a constant temperature, the quantity of hot air to be supplied for temperature adjusting purposes may be determined monistically, so long as the speed of the gas flow is maintained constant. In other words, the exhaust gas from the rotary kiln contains no oxygen essentially, such that an increase in the flow speed of gas to be introduced into the vertical cylinder due to an increase in quantity of the hot gas being exhausted from the rotary kiln will require an increase in the amount of the powdery raw material per hour, and thereby the density of the powdery raw material in the vertical cylinder may be increased, while the quantity per hour of the air to be supplied into the cylinder should be increased to enable burning of the fuel required for the calcination of the powdery raw material of increased density. This can maintain constant the quantity of hot gas exhausted from the rotary kiln into the vertical cylinder due to the adjustment in quantity, of hot air to be introduced into the vertical cylinder.

However, in practice, it is impossible to raise the flow speed of the gas without limitation. This is because of the limitation arising from the absolute capacity of a rotary kiln, the limitation from refractoriness of a vertical cylinder, and the like, and thus the flow speed of gas may not be determined monistically, also due to other factors such as the capacity of a vertical cylinder. However, for instance, in the case of the apparatus of a yield of 2000 ton/day, the flow speed of the gas falls in the range from 20 to 30 m/s for the smallest diameter portion of the cylinder, the feeding rate of powdery raw material is in the range from 4 to 6 t/min, and the quantity of adjusting air to be supplied is 10 to 13 $Nm^3/s$.

On the other hand, it is recommendable that the opening angle of the divergent nozzle type cylinder be in the range from 18° to 30°, whereby the powdery raw material for cement may be maintained therein in an optimum condition for heat exchange.

As is apparent from the foregoing description of the invention, the powdery raw material is heated to a temperature which is only required for enhancing the reaction for producing clinker, and thus only the heat required for maintaining such a temperature is added, such that the heat consumption in the rotary kiln which is of poor heat exchange efficiency, may be minimized. As a result, the temperature of the hot gas exhausted from the kiln may be maintained substantially constant, and then hot gas from the kiln is mixed with hot air which has been adjusted for a given temperature, such that the temperature inside the vertical cylinder may be controlled to aa given temperature at all times. In addition, since the hot air in the mixed gas is that which has been obtained from heating of air from the cooling device, the fuel consumption in the rotary kiln may accordingly be minimized. It should be noted that the mixed gas to be supplied to the vertical cylinder ensures satisfactory burning of fuel in th cylinder and may control the temperature of the atmosphere therein, with the aid of the control of the amount of fuel to be supplied into the vertical cylinder.

Furthermore, there are a plurality of whirl flows of mixed gas and powdery raw material in a suspension state therein, and the powdery raw material is injected into such whirl flows through an opening in the side wall of the cylinder, whereby the powdery raw material may be carried on the ascending flow of hot mixed gas to the center portion of the cylinder, in which a high temperature zone is formed. This causes the raw material to be efficiently heated. On the other hand, the whirl flows created along the wall side of the cylinder further causes circulating flows, whereby the raw material may be efficiently calcinated in this step. The gas carrying the powdery raw material thereon flows along the side wall of the cylinder to prevent the same from being exposed to high temperature, whereupon, at the time of turn-over flow subsequent thereto, the powdery raw material may be separated from gas flow due to centrifugal action. As the raw material is fed in the cylinder continuously from above, the density of the powdery raw material may be increased therewith, thus sinking against the ascending flow of hot gas within the cylinder for being fed in a calcinated state to the kiln along the side wall of the cylinder. Damage of the vertical cylinder due to heat may be effectively prevented by the interposition of the powdery raw material, and thereby, there will not result adhesion of raw material to the inner wall, even if overheated, because of the presence of protective flows of the raw material along the side wall of the cylinder.

In this manner, the method and apparatus of the present invention for use in firing raw material for cement, using a counter-flow heat exchange device, can present effective temperature control for the various portions of the apparatus particularly for the vertical preheating cylinder and the hot air from the cooling device, thereby achieving improved yield per hour with a minimized consumption of fuel.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow:

What is claimed as new and desired to be secured by Letters Patent of the U.S. is:

1. A method for use in firing raw material for use in the production of cement, utilizing a combination of a counter-flow type preheating device with an upwardly divergent configuration for preheating raw material of cement, a rotary kiln for firing the raw material preheated in said preheating device and a cooling device for cooling burnt clinker produced as the result of firing the preheated raw material in said rotary kiln, in which air acts as a coolant in a cooling device and is subsequently heated, comprising the steps of:

withdrawing and further heating said heated air from said cooling device;

mixing said further heated air with hot gas being directly exhausted from said rotary kiln, thereby adjusting the temperature of said mixed gas being so formed so as to be higher than that of the raw material heated in said preheating device;

introducing said mixed gas into the bottom of said upwardly divergent preheating device in an ascending manner;

feeding powdery raw material into said preheating device from above so as to flow downwardly in a counter-flow manner with respect to said ascending mixed gas; and supplying fuel into said preheating device to burn the same with said mixed gas, whereby coment raw material in a powder form flowing therein and carried on the gas flow therein may be calcinated and caused to flow downwardly against the ascending flow of said mixed gas for being fed into said rotary klin.

2. A method as defined in claim 1, wherein said method further comprises:

supplying heat of no more than 10% of the total heat to be supplied to the entire process to the hot air from said cooling device, to thereby raise the temperature of said hot air;

supplying said fuel in an amount to produce heat of 30 to 70% of the total heat required for the entire process into said preheating device; and supplying the remaining heat of said total heat to said raw material being introduced in said kiln.

3. A method as defined in claim 2, wherein the heat supplied to the hot gas from said cooling device is in the range of 3 to 8% of the total heat required for the entire process, and the heat supplied to said upwardly divergent preheating device is in the range of 50 to 65% of said total heat.

4. A method as defined to claim 1, wherein the speed of axial flow of the mixed gas within said upwardly divergent preheating device is in the range from 20 to 30 m/s at the smallest cross-sectional area of the lower part of said preheating device.

* * * * *